Patented Aug. 20, 1940

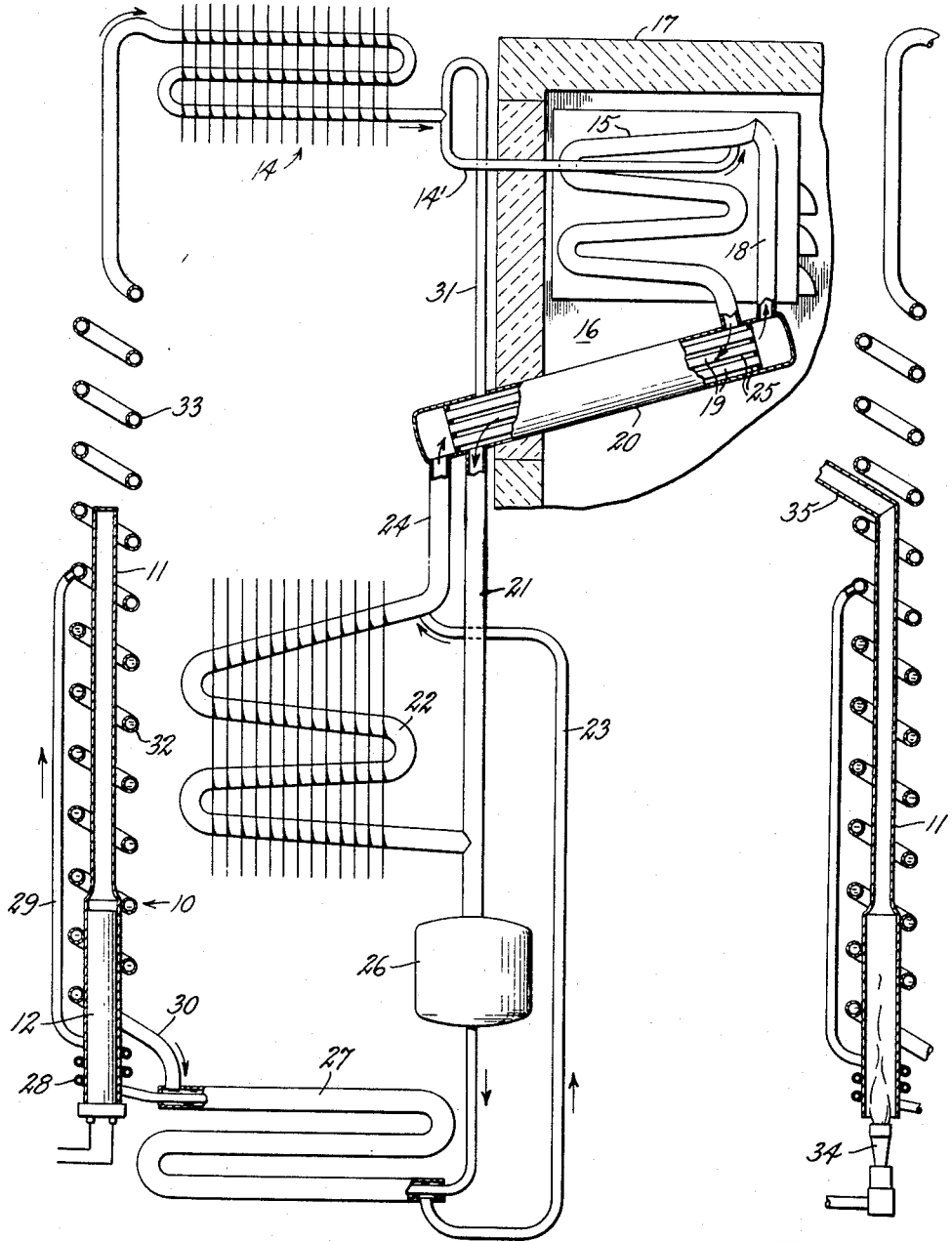

2,212,111

UNITED STATES PATENT OFFICE 2,212,111

REFRIGERATION

Gustav Mårten Blomqvist and Sture Folke Torstensson, Stockholm, Sweden, assignors, by mesne assignments, to Servel, Inc., New York, N. Y., a corporation of Delaware Application March 25, 1937, Serial No. 132,920 In Germany April 1, 1936

8 Claims. (Cl. 62—119.5)

This invention relates to refrigeration, and more particularly to refrigeration apparatus in which vapor is expelled out of solution in a boiler or generator.

When applying heat to a generator or boiler to expel refrigerant vapor out of absorption liquid, the amount of vapor of absorption liquid accompanying the refrigerant vapor should be as small as possible, because the expulsion of vapor of absorption liquid and subsequent condensation thereof outside the generator represents a heat loss.

It is an object of this invention to provide an improvement in generators or boilers for absorption refrigeration systems in which the refrigerant vapor expelled out of absorption solution contains a minimum quantity of vapor of the absorption solution. We accomplish this by providing a generator having a conduit for containing a solution of absorption liquid and refrigerant, and introducing strong solution into one part of the conduit and withdrawing weak solution from another part of the conduit, the conduit preferably being so arranged that a heating member is in better heat exchange relation with the part of the conduit from which weak solution is withdrawn.

The invention and the objects and advantages thereof will be more fully understood from the following description taken in connection with the accompanying drawing forming a part of this specification and of which Fig. 1 diagrammatically illustrates absorption refrigeration apparatus provided with a generator embodying the invention; and Fig. 2 is a fragmentary view illustrating a modification of the generator shown in Fig. 1.

Referring to the drawing, we have shown the invention embodied in a type of absorption refrigeration apparatus generally like that described in Patent 1,609,334 to von Platen and Munters. It is to be understood, however, that the invention can be employed with other types of absorption refrigeration apparatus.

The refrigeration apparatus includes a generator 10 containing a refrigerant, such as ammonia, in solution in a body of absorption liquid, such as water. The generator 10 is provided with a sleeve or tube 11 which is closed at its upper end and within the lower end of which is disposed an electrical heating element 12. The heat applied to the generator 10 and its contents expels ammonia vapor out of solution. The ammonia vapor flows upward to an air-cooled condenser 14 in which it is liquefied. Liquefied ammonia flows from condenser 14 through conduit 14' into the upper end of an evaporator or cooling element 15. The evaporator 15 is disposed in an enclosed space 16 which may form a food storage compartment of a thermally insulated refrigerator cabinet 17.

An auxiliary agent or inert gas, such as hydrogen, enters the upper end of the evaporator 15 through a conduit 18. Liquid ammonia evaporates and diffuses into the hydrogen with consequent absorption of heat from the surroundings of the evaporator 15. The resulting rich gas mixture of ammonia and hydrogen flows from the evaporator 15 through an outer passage 19 of a gas heat exchanger 20 and vertical conduit 21 into the lower end of an air-cooled absorber 22.

Ammonia is absorbed out of the enriched gas mixture into weak absorption liquid which enters the upper part of the absorber 22 from a conduit 23. The hydrogen, which is practically insoluble and weak in ammonia, passes upward from the absorber 22 through a conduit 24, a plurality of parallel tubes 25 which form the inner passage of the gas heat exchanger 20, and conduit 18 into the upper end of the evaporator 15.

The absorption liquid in the absorber 22 becomes enriched in ammonia and passes through the lower end of conduit 21 into an accumulation vessel 26. From the vessel 26 the enriched absorption liquid flows through the inner passage of a liquid heat exchanger 27 to a coil 28, and is raised by vapor-lift action through conduit 29 into the upper part of the generator 10. The absorption liquid weak in ammonia flows from the lower part of the generator through a conduit 30, outer passage of the liquid heat exchanger 27 and conduit 23 into the upper end of the absorber 24.

The lower end of the condenser 14 is connected by a conduit 31 to the gas circuit, as at the gas heat exchanger, for example, so that any non-condensible gas which may pass into the condenser can flow to the gas circuit and not be trapped in the condenser.

In accordance with this invention, generator 10 comprises a coil 32 which is so arranged with respect to the heating element 12 that a steep gradient in concentration of solution is maintained between the upper part thereof into which enriched absorption solution is introduced through conduit 29, and the lower part thereof from which weak absorption solution is withdrawn through conduit 30 and conducted to the absorber 22. This is accomplished by only having the lower turns of coil 32 in thermal contact with the lower part of the sleeve or tube 11 within which is disposed the heating element 12. Above the heating element 12 the sleeve or tube 11 is reduced in size and spaced from the coil 32.

The internal diameter of the tubing forming the spiral coil 32 is relatively small, such as 14 mm., for example, so that turbulence and convection of liquid solution in the coil are effectively dampened. The internal diameter of the tubing, as well as the pitch of the individual turns of the coil, are such that vapor bubbles will ascend in the absorption solution without disturbing downward flow of the latter in the coil. In other words, the tubing is of such size and the individual turns of the coil are of such pitch that no vapor-lift or pumping action will take place in coil 32 and disturb downward movement of absorption solution from the upper end of conduit 29 into conduit 30.

In operation, enriched absorption solution enters the upper part of coil 32 from conduit 29 by vapor-lift action due to heating of the coil 28 by the heating element 12. The enriched absorption solution descends in coil 32 and during such downward movement becomes progressively hotter and also progressively weaker due to expulsion of refrigerant vapor therefrom. The bubbles of refrigerant vapor formed in the column of liquid solution rise and pass out of solution at the region where the concentration of absorption solution is strongest.

By having the lower turns of coil 32 in thermal contact with the heating element 12 and the upper turns thereof out of thermal contact with the heated parts of the generator, the turns of the coil at the upper end of conduit 29 are maintained relatively cool. Thus, the vapor of absorption liquid contained in the ascending bubbles of ammonia vapor, particularly in the bubbles of ammonia vapor formed in the lower turns of the coil adjacent the heating element 12, is effectively condensed as it passes through the cooler absorption solution in the upper part of the coil. Since the concentration of absorption solution is strongest at the upper part of coil 32, the latent heat of condensation of the absorption liquid provides additional heat for generating ammonia vapor so that substantially pure ammonia vapor is expelled out of solution. Since the lower turns of coil 32 are in thermal contact with the source of heat, this part of the coil will be the hottest with the result that the weakest absorption solution is withdrawn through conduit 30 and conducted to absorber 22.

A generator of the character just described has the important advantage that the coil 32 can be extended above the conduit 29 to form an air-cooled rectifier 33, thereby insuring the condensation of any vapor of absorption liquid that may accompany the refrigerant vapor. The generator and rectifier can therefore be formed as one part of the refrigeration apparatus rather than as separate parts which must later be connected together.

In Fig. 2 we have shown a modification in which the generator 10 is heated by a gas burner 34 instead of an electrical element. In such case the sleeve or tube 11 serves as a flue through which are discharged the hot combustion gases. As in the embodiment described above and shown in Fig. 1, only the lower turns of coil 32 are in thermal contact with the lower end of the flue into which the burner flame projects. In order that the upper part of coil 32 will not be heated by the hot combustion gases, the upper reduced end of the flue is offset at 35.

Although several embodiments of the invention have been shown and described, it will be apparent to those skilled in the art that modifications may be made without departing from the spirit and scope of the invention, as pointed out in the following claims.

What is claimed is:

1. In an absorption refrigeration apparatus, a generator comprising a vertically extending coil for containing a solution of absorption liquid and refrigerant and constructed and arranged to permit free relative movement of refrigerant vapor and absorption liquid, means for introducing strong solution into an upper part of said coil, means for withdrawing weak solution from a lower part of said coil, and means for heating said coil and including an element in thermal transfer relation by contact with a part of said coil at or adjacent to the region from which weak solution is withdrawn, and in thermal transfer relation only by radiation with another part of said coil.

2. In an absorption refrigeration apparatus, a generator comprising a vertically extending spiral coil for containing a solution of absorption liquid and refrigerant and constructed and arranged to permit free relative movement of refrigerant vapor and absorption liquid, a tubular member extending upward within said coil, means for introducing strong solution into an upper part of said coil, means for withdrawing weak solution from a lower part of said coil, the lower part of said tubular member being in thermal contact with said coil, and means for heating said tubular member.

3. In an absorption refrigeration apparatus, a generator comprising a vertically extending spiral coil for containing a solution of absorption liquid and refrigerant and constructed and arranged to permit free relative movement of refrigerant vapor and absorption liquid, a member for introducing strong solution into an upper part of said coil, a member for withdrawing weak solution from a lower part of said coil, a flue extending upward within said coil and having only the lower part thereof in thermal contact with said coil adjacent the part from which weak solution is withdrawn, and means disposed adjacent the lower end of said flue for heating the latter.

4. In an absorption refrigeration apparatus, a generator comprising a vertically extending spiral coil for containing a solution of absorption liquid and refrigerant and constructed and arranged to permit free relative movement of refrigerant vapor and absorption liquid, means for introducing strong solution into an upper part of said coil, means for withdrawing weak solution from a lower part of said coil, a flue extending upward within said coil and having only the lower part thereof in thermal contact with said coil adjacent the part from which weak solution is withdrawn, and means including a burner disposed adjacent the lower end of said flue for heating the latter, the upper end of said flue being offset with respect to said coil.

5. In an absorption refrigeration apparatus having a condenser, a generator comprising a vertically extending spiral coil for containing a solution of absorption liquid and refrigerant and constructed and arranged to permit free relative movement of refrigerant vapor and absorption liquid, means for introducing strong solution into a part of said coil intermediate its ends, means for withdrawing weak solution from the lower end of said coil, a flue extending upward within said coil and having the lower part thereof in thermal contact with said coil adjacent the lower end from which weak solution is withdrawn, means for heating said flue, the upper part of said flue being offset with respect to the part of said coil above the region into which strong solution is introduced.

6. An absorption refrigeration system having a generator comprising a vessel for holding an upright column of absorption liquid, a heater arranged for heat transfer therefrom laterally to said column through a low resistance path at the lower end and through a higher resistance path at a higher place, and conduits for delivering rich solution to the upper end of said column and withdrawing weak solution at the lower end of said column.

7. A refrigeration system as set forth in claim 6 in which said vessel is a pipe coil.

8. An absorption refrigeration system including a conduit having a cross-sectional area large enough to permit free relative movement of vapor and liquid therein, said conduit being formed to occupy a space of which all dimensions are less than the length of said conduit, said conduit being arranged and connected in the system so as to contain an elongated body of liquid, and a source of heat, a portion of said conduit being heated by conduction from said heat source and forming a place of vapor expulsion, and another portion of said conduit being heated only by radiation from said source.

GUSTAV MÅRTEN BLOMQVIST.
STURE FOLKE TORSTENSSON.